United States Patent
Suskind et al.

(10) Patent No.: US 9,704,103 B2
(45) Date of Patent: Jul. 11, 2017

(54) DIGITAL COMPANIONS FOR HUMAN USERS

(71) Applicant: The Affinity Project, Inc., Cambridge, MA (US)

(72) Inventors: Ronald Steven Suskind, Cambridge, MA (US); H. Owen Suskind, Hyannis, MA (US); Cornelia Kennedy Suskind, Cambridge, MA (US)

(73) Assignee: The Affinity Project, Inc., Cambridge, MA (US)

( * ) Notice: Subject to any disclaimer, the term of this patent is extended or adjusted under 35 U.S.C. 154(b) by 0 days.

(21) Appl. No.: 14/571,472

(22) Filed: Dec. 16, 2014

(65) Prior Publication Data
US 2016/0171387 A1 Jun. 16, 2016

(51) Int. Cl.
*G06N 99/00* (2010.01)
*G10L 25/51* (2013.01)
(Continued)

(52) U.S. Cl.
CPC .......... *G06N 99/005* (2013.01); *G06N 5/022* (2013.01); *G09B 19/04* (2013.01); *G10L 25/51* (2013.01);
(Continued)

(58) Field of Classification Search
None
See application file for complete search history.

(56) References Cited

U.S. PATENT DOCUMENTS

| | | | | |
|---|---|---|---|---|
| 6,230,111 B1* | 5/2001 | Mizokawa | ............. | G06N 3/004 345/473 |
| 6,731,307 B1* | 5/2004 | Strubbe | .................. | G06N 3/004 704/E17.002 |

(Continued)

FOREIGN PATENT DOCUMENTS

CN 104483847 A * 4/2015
JP 2012093972 A * 5/2012
(Continued)

OTHER PUBLICATIONS

Bemelmans et al., "The Potential of Socially Assistive Robotics in Care of Elderly, a Systematic Review", 2011, Third Intrernational Conference HRPR 2010, pp. 83-89.*

(Continued)

*Primary Examiner* — Paulinho E Smith
(74) *Attorney, Agent, or Firm* — Fish & Richardson P.C.

(57) ABSTRACT

A succession of conversations are facilitated between a user of a device and a non-human companion portrayed on the device, to develop a relationship between the user and the non-human companion over a time period that spans the successive conversations. The relationship is developed between the user and the non-human companion to cause a change in a state of the user over the time period. A conversation is facilitated by presenting a segment of speech of the non-human companion to the user and detecting a segment of speech of the user, the segments including a portion of the conversation. At the device, information is received from an intelligent agent about a next segment of speech to be presented to the user, as determined by the intelligent agent based on intelligent processes applied to the segment of speech of the user and to the change in state to be caused.

24 Claims, 1 Drawing Sheet

(51) Int. Cl.
    *G06N 5/02*           (2006.01)
    *G09B 19/04*         (2006.01)
    *G10L 15/00*         (2013.01)
    *G10L 21/013*       (2013.01)
    *G10L 13/033*       (2013.01)

(52) U.S. Cl.
    CPC ............ *G10L 13/033* (2013.01); *G10L 15/00* (2013.01); *G10L 2021/0135* (2013.01)

(56) References Cited

U.S. PATENT DOCUMENTS

| | | | | |
|---|---|---|---|---|
| 6,795,808 | B1* | 9/2004 | Strubbe | G06F 17/30702 704/270 |
| 7,606,714 | B2 | 10/2009 | Williams | |
| 2004/0147814 | A1* | 7/2004 | Zancho | H04M 19/04 600/300 |
| 2008/0077277 | A1* | 3/2008 | Park | G06N 3/008 700/245 |
| 2009/0055019 | A1* | 2/2009 | Stiehl | B25J 9/1671 700/249 |
| 2009/0319459 | A1* | 12/2009 | Breazeal | G06N 3/004 706/46 |
| 2012/0101847 | A1 | 4/2012 | Johnson | |
| 2012/0295510 | A1* | 11/2012 | Boeckle | A63H 3/28 446/72 |
| 2013/0090949 | A1 | 4/2013 | Tibebu | |
| 2013/0316324 | A1 | 11/2013 | Hoffmann | |
| 2013/0326386 | A1 | 12/2013 | Vendrell | |
| 2014/0018382 | A1* | 1/2014 | DeLack | A61K 31/40 514/280 |
| 2014/0150791 | A1 | 6/2014 | Birnkrant | |
| 2014/0156645 | A1 | 6/2014 | Brust et al. | |
| 2014/0212854 | A1* | 7/2014 | Divakaran | G09B 25/00 434/236 |
| 2014/0347265 | A1* | 11/2014 | Aimone | G09G 3/003 345/156 |
| 2015/0170531 | A1 | 6/2015 | Hu et al. | |
| 2015/0294595 | A1 | 10/2015 | Hu et al. | |
| 2015/0336276 | A1* | 11/2015 | Song | B25J 11/001 700/253 |
| 2016/0005326 | A1* | 1/2016 | Syrmis | G09B 9/00 434/362 |
| 2016/0117953 | A1 | 4/2016 | Lluch | |
| 2016/0171971 | A1 | 6/2016 | Suskind et al. | |

FOREIGN PATENT DOCUMENTS

| | | | |
|---|---|---|---|
| JP | 5539842 B2 * | 7/2014 | |
| WO | WO 2013/166146 | 11/2013 | |
| WO | WO 2013166146 A1 * | 11/2013 | G06Q 10/10 |
| WO | WO 2016/099827 | 6/2016 | |

OTHER PUBLICATIONS

Acapela Group, "Voice synthesis—Text to Speech | voice solutions" [online], [retrieved on Dec. 2, 2014]. Retrieved from the Internet: http://www.acapela-group.com/, 4 pages.

AITalk® Customer Voice, "Original Voice Dictionary Creating Service" [online], [retrieved on Dec. 2, 2014]. Retrieved from the Internet: http://www.ai-j.jp/english/product/customvoice.html, 2 pages.

Bohus et al., "Sorry, I Didn't Catch That!—An Investigation of Non-understanding Errors and Recovery Strategies" [online], [retrieved on Dec. 2, 2014]. Retrieved from the Internet: http://www.cs.cmu.edu/~dbohus/docs/nonu_final.pdf ,16 pages.

CereProc, "Voice Creations FAQs" [online], [retrieved on Dec. 2, 2014]. Retrieved from the Internet: https://www.cereproc.com/en/support/faqs/voicecreation, 3 pages.

Cleverscript, "Create a clever script" (conversational AI engine by Existor Ltd © 2012-2014) [online], [retrieved on Dec. 2, 2014]. Retrieved from the Internet: www.cleverscript.com, 2 pages.

Cleverscript, "Manual and Tutorial" [online], [retrieved on Dec. 2, 2014]. Retrieved from the Internet: http://www.cleverscript.com/CSL/CleverScriptManual.pdf, 76 pages.

Existor, "Evie—Electronic Virtual Interactive Entity—Artificial Intelligence is communication" [online], [retrieved on Dec. 2, 2014]. Retrieved from the Internet: http://www.existor.com, 1 page.

Ezzat et al., "Trainable Videorealistic Speech Animation" Massachusetts Institute of Technology [online], [retrieved on Dec. 2, 2014]. Retrieved from the Internet: http://cbcl.mit.edu/cbcl/publications/ps/siggraph02.pdf, 11 pages.

Festvox, "Transform" [online], [retrieved on Dec. 2, 2014]. Retrieved from the Internet: http://www.festvox.org/transform/, 2 pages.

iSpeech, "Powerful Speech Platform" [online], [retrieved on Dec. 2, 2014]. Retrieved from the Internet: http://www.ispeech.org, 7 pages.

Leuski et al., "NPCEditor: A Tool for Building Question-Answering Characters" [online], [retrieved on Dec. 2, 2014]. Retrieved from the Internet: http://people.ict.usc.edu/~leuski/publications/papers/npceditor.pdf, 8 pages.

Massachusetts Institute of Technology, "Scientists collaborate internationally to identify the neural mechanisms and possible benefits of 'Affinity Therapy' in children with autism" (Apr. 24, 2014) [online], [retrieved on Dec. 2, 2014]. Retrieved from the Internet: https://iacc.hhs.gov/non-iacc-events/2014/nimh_lecture_ron_suskind_042414.pdf, 1 page.

Pappu et al., "Predicting Tasks in Goal-Oriented Spoken Dialog Systems using Semantic Knowledge Bases" *Proceedings of the SIGDIAL 2013 Conference*, pp. 242-250 (Aug. 22-24, 2013) [online], [retrieved on Dec. 2, 2014]. Retrieved from the Internet: https://aclweb.org/anthology/W/W13/W13-4038.pdf, 9 pages.

Screaming Bee Inc., "MorphVOX Pro Voice Change" [online], [retrieved on Dec. 2, 2014]. Retrieved from the Internet: http://www.screamingbee.com/, 1 page.

SitePal, "Text-to-Speech" [online], [retrieved on Dec. 2, 2014]. Retrieved from the Internet: http://www.sitepal.com/ttswidgetdemo/, 1 page.

Strannegard et al., "A General System for Learning and Reasoning in Symbolic Domains" [online], [retrieved on Dec. 2, 2014]. Retrieved from the Internet: http://agi-conf.org/2014/wp-content/uploads/2014/08/strannegard-general-agi14.pdf, 12 pages.

The New York Times, "Inside the Mind of a Child with Autism," written by Benedict Carey on Apr. 7, 2014 [online], [retrieved on Dec. 2, 2014]. Retrieved from the Internet: http://well.blogs.nytimes.com/2014/04/07/inside-the-mind-of-a-child-with-autism/?_r=0, 3 pages.

Wired.Co.Uk, "IBM reveals 'brain-like' chip with 4,096 cores," written by Daniela Hernandez on Aug. 8, 2014 [online], [retrieved on Dec. 2, 2014]. Retrieved from the Internet: http://www.wired.co.uk/news/archive/2014-08/08/ibm-brain-like-chip, 8 pages.

Yale Daily News, "Suskind sparks autism research," written by Eddy Wang on Apr. 15, 2014 [online], [retrieved on Dec. 2, 2014]. Retrieved from the Internet: http://yaledailynews.com/blog/2014/04/15/suskind-sparks-autism-research/, 2 pages.

International Search Report and Written Opinion for App. Serial. No. PCT/US15/62416, mailed Feb. 5, 2016, 11 pages.

Hamilton, "Eugene Goostman versus Siri" (Jun. 10, 2014) [online], [retrieved on Mar. 16, 2016]. Retrieved from the Internet: http://www.lauradhamilton.com/eugene-goostman-versus-siri, 3 pages.

Levy, "Siri's Inventors are Building a Radical New AI that Does Anything You Ask" (Aug. 12, 2014) [online], [retrieved on Mar. 16, 2016]. Retrieved from the Internet: http://www.wired.com/2014/08/viv/, 2 pages.

Suskind, "Life, Animated: A Story of Sidekicks, Heroes, and Autism," Apr. 2014, 358 pages.

Office Action for U.S. Appl. No. 15/015,891 dated Aug. 12, 2016, 20 pages.

U.S. Appl. No. 15/015,891.
U.S. Appl. No. 61/916,701, filed Dec. 16, 2013, Hu et al.
U.S. Appl. No. 15/468,218, filed Mar. 24, 2017.
U.S. Appl. No. 15/468,727, filed Mar. 24, 2017.

(56) References Cited

OTHER PUBLICATIONS

U.S. Appl. No. 15/166,333, filed May 27, 2016.
U.S. Appl. No. 15/166,507, filed May 27, 2016.
U.S. Appl. No. 15/015,891, filed Feb. 4, 2016.

* cited by examiner

DIGITAL COMPANIONS FOR HUMAN USERS

This application relates to digital companions for human users.

SUMMARY

In general, in an aspect, successive conversations are facilitated between a user of a device and a non-human companion portrayed on the device, to develop a relationship between the user and the non-human companion over a time period that spans the successive conversations. The relationship is developed between the user and the non-human companion to cause a change in a state of the user over the time period. Each of the successive conversations is facilitated by actions that include the following. A segment of speech of the non-human companion is presented to the user. A segment of speech of the user is detected. The user's segment of speech and the segment of speech presented to the user include portion of the conversation. At the device, information is received from an intelligent agent about a next segment of speech to be presented to the user, as determined by the intelligent agent based on intelligent processes applied to the segment of speech of the user and to the change in state to be caused.

Implementations may include one or a combination of any two or more of the following features. The companion is portrayed through speech and images or video. The companion is portrayed as an animated character. The relationship is caused to change over time. Characteristics or behavior or both of the companion change over time based on intelligent processes of the intelligent agent. The time period over which the relationship is developed is at least a year. The change in state includes an improvement in a diagnosed psychological or behavioral condition. The developing of the relationship to cause the change of state includes therapy. The therapy includes affinity therapy and the user is autistic. Non-interaction with the user is facilitated. The non-speech interaction includes presenting information to the user. The information is presented on a display of the device. The non-speech interaction includes receiving input from the user. The intelligent agent includes a human. The segment of speech of the user and information about interaction by the user with the device are provided in real-time to the human.

The intelligent agent includes an automated process. The intelligent agent includes both an automated process and a human who interacts with the automated process. The automated process and the human interact. The user is unaware of the operation of the intelligent agent. The intelligent agent explicitly or implicitly elicits from the user information about the user's beliefs, opinions, emotions, goals, or desires. The intelligent agent derives personal and demographic information about the user. The intelligent agent acquires knowledge from public online sources of general information. A knowledge graph is formed for the user. A log is maintained of the successive conversations and interactions between the user and the device. The log is made available to a third party for study.

The companion is portrayed as having certain characteristics that include at least one of the following: responsiveness, initiative, moodiness, emotion, opinions, beliefs, correct ability, and self-awareness. The intelligent agent is corrected when it makes a mistake. The user and other users who share common characteristics are stereotyped, and the intelligent agent takes advantage of the stereotyping. Concepts used in the conversations are represented by a uniform knowledge representation.

The intelligent agent includes a human, and the human's voice is morphed for presentation to the user on the device. The morphing includes morphing to the vocabulary, grammar, and knowledge of the companion. The intelligent agent includes an automated intelligent agent, and the automated intelligent agent learns from scratch rather than being pre-trained.

In general, in an aspect, successive spoken conversations and non-spoken interactions are facilitated electronically between a virtual companion portrayed on a device and a user of the device. A relationship between the user and the virtual companion develops over a time period that spans the successive conversations and the interactions. The relationship causes a change in a psychological state or behavior of the user over the time period. Each of the successive conversations and interactions includes the following. A segment of speech of the virtual companion or a segment of non-speech information is presented electronically to the user. A segment of speech or a segment of non-speech input of the user is detected. Each of the user's segments of speech and the segments of speech presented to the user comprise a portion of the conversation. The segment of other information presented to the user and the segment of non-speech input of the user comprise a portion of the interaction. Information is received at the device about a next segment of speech or a next segment of non-speech information to be presented to the user, as determined by the intelligent agent. The determination of the intelligent agent is based on (a) intelligent processes applied to at least one of the segment of speech presented to the user and the segment of non-speech input of the user speech previously presented to the user and (b) on the change in psychological state or behavior to be caused.

These and other aspects, features, and implementations, and combinations of them, can be expressed as methods, program products, business methods, systems, components, apparatus, means and steps for performing functions, and in other ways.

These and other aspects, features, and implementations, and combinations of them, will become apparent from the following description, and from the claims.

DETAILED DESCRIPTION

Figure 1:
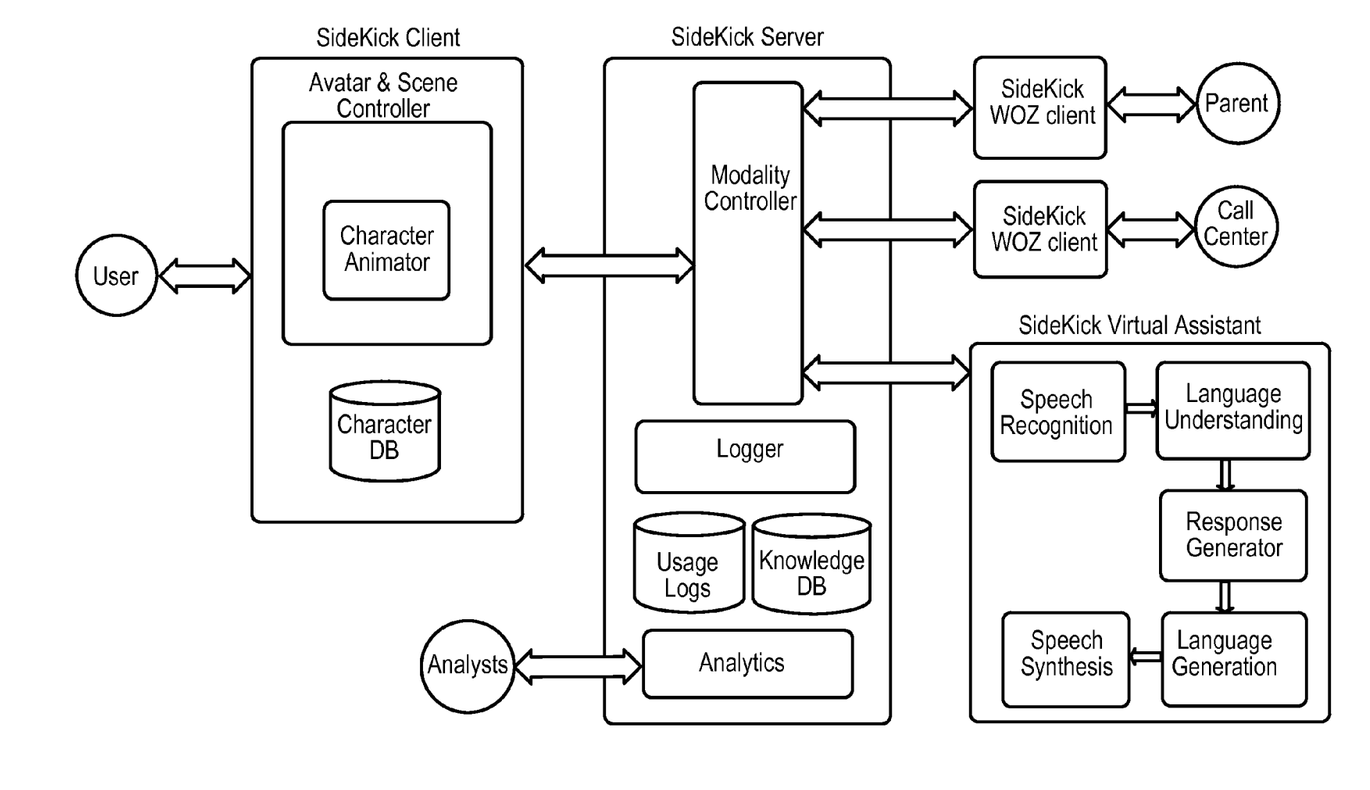
FIG. 1 is a block diagram of a system to provide digital companions for users.

Here we describe digital companions for human users. We also describe ways for the digital companions to have intelligent well-behaved conversations and interactions with the human users in order to improve their lives, provide therapy (such as affinity therapy for autistic users), help them reach their goals, and achieve other benefits.

In some implementations, these digital companions perform their roles by interacting with users through human-machine interfaces presented by digital devices. In some cases, a digital companion is devoted to serving one particular user. We refer to the user as the digital companion's "pal" in some contexts. Intelligent processes (often taken place "behind the scenes") cause each digital companion to develop a relationship over time in which the digital company is perceived as trustworthy, well behaved, and interesting to interact with. Because of the nature of the relationship that develops the character and behavior of the digital companion can be used to change benefit the user in a variety of ways. After repeated conversations and interactions, the digital companion can evolve to become more effective and personalized in serving its pal, tailoring itself (though the use of intelligent processes) to help its pal to achieve her goals, desires, or needs.

We sometimes refer to the digital companion as simply a "companion," a term that we use to imply a broad range of possible roles, for example, as a friend, a colleague, a buddy, a confidant, a servant, a teacher, a therapist, or a helper, among others, depending on the pal, the goals, and the specific application.

We use the term "digital device" (or simply "device") broadly to refer, for example, to any electronic hardware, tool, appliance, contraption, gizmo, or gadget that can present features of a human-machine interface to a user. In some cases, the digital device could be a mobile phone, pad, tablet, laptop, camera, wearable, workstation, kiosk, television, radio, sound system, or personal digital assistant or a combination of two or more of them, to name a few examples.

The term "human-machine interface" refers broadly to, for example, any audio, graphical, video, haptic, or other mode, or combination of modes, by which the companion and its pal can interact with one another, for example. We sometimes refer to the human-machine interface simply as an "interface."

Typically the device has hardware elements through which the modes of the interface operate to enable the companion and its pal to have conversations and interactions. We use the term "hardware elements" broadly to include anything capable of producing all or part of a mode of interaction used by the interface and associated with conversations or interaction of the companion and the pal, for example, displays, speakers, earphones, microphones, cameras, video cameras, vibrators, lights, thermometers, thermometers, pulse detectors, any other kinds of biosensors, and other kinds of detectors, sensors, or combinations of them, as well as other elements.

The companion is portrayed to its pal through the interface by a combination of the interaction modes. We use the term "portray" broadly to include any manner of making the character and behavior of the companion apparent to the user, including, for example, depicting, presenting, representing, showing, or revealing. In some cases, the companion speaks and is displayed to the pal.

In some examples, the interaction modes are selected, integrated, unified, and configured to give the companion's pal an impression that the pal is interacting not only with a device that is inanimate and impersonal but also with a pal that embodies characteristics, knowledge, and behaviors of a human or animal or animated character, for example. We sometimes refer to these features simply as the "character" and "behavior" of the companion. The character and behavior of the companion can be chosen and crafted to be especially suitable to the character and behavior of the pal that the companion serves, or the role that the companion is performing, or for other purposes, or combinations of these.

Among other things and in some cases, the companion can use natural language speech or writing as a tool for communication with its pal. The content, style, and tone of the natural language (and other communication tools) used by the companion are selected to be suitable for the character and behavior of the companion, the character and behavior of the pal, the context of the communication, and the nature of the application. Information about the character and behavior of each companion can be stored so that the device and other parts of the system can operate to portray each companion consistently and correctly to its pal.

In some implementations, conversations between a pal and his companion are a fundamental feature of their interaction. We use the term "conversation" broadly to include, for example, any communication between the pal and the companion in any form, for example, spoken natural language, written prose, gestures, and others. A conversation may involve natural language dialogue, and in that case, we sometimes use the phrase "dialogue segment" (or simply "segment") to refer to a part of a conversation that is communicated by one or the other of the pal and the companion. A conversation typically reflects both content (the substance of what is being communicated) and form (the vocabulary, style, emphasis, and other aspects of how the content is embodied in the communication).

Non-speech interaction between the companion and the pal also can be understood as occurring in segments.

For example, a pal can say something to the companion in a segment of a conversation and can enter non-speech inputs into the device in a segment of a non-speech interaction. The companion can respond by saying something to the pal in a segment of the conversation and can present information to the user on a display of the device as a segment of the non-speech interaction. This sequence can be repeated many times in the course of the conversation and interaction. At some point, the conversation can end, for example, if the pal turns off the device. Later, one or more other conversations occur. The sequence of conversations can last for days, weeks, months, years, or even a lifetime. During the sequence the companion can change and adapt, as can the relationship that develops with the pal. Changes (which can be minor or significant) in the behavior, character, and other aspects of the state of the pal can occur, sometimes deliberately driven by the intelligent processes based on the particular application.

In some instances, the companion can be portrayed through the interface and the device as a cartoon or animated figure, an avatar, a manipulated video of an animal or human, or various other animation and claymation characters.

The character and behavior of the companion, for example, in the conversations and interactions that occur between the pal and the companion, are determined by operations performed by an intelligent agent that is "behind the scenes" in some implementations. The pal of the companion need not observe or know about or be aware of the existence, nature, or operation of the intelligent agent. In some implementations, the intelligent agent may be a human being (which we call a "human intelligent agent") or a computer process (which we call an "automated intelligent agent") that employs principles of artificial intelligence, expert systems, machine learning, or other regimes that use information, including information provided by experts, to generate intelligent conclusions, analyses, or outputs.

In some cases, the intelligent agent can be a combination of a human being and an intelligent computer process that work together or support each other or can substitute for each other as needed. In some cases, the intelligent agent could be only a human being and in some cases only an automated intelligent computer process. Typically, a useful system of the kind that we are describing could not be operated to support a large number of companions based only on human intelligent agents. Human intelligent agents could not alone perform the operations that would be required and intelligent computer processes would have to be involved.

The character and behavior of the companion can develop and evolve over time. That development and evolution can be achieved by a corresponding development and evolution of the intelligent agent that supports the companion. Development and evolution of the intelligent agent in turn is founded on the operation of the intelligent agent as it processes new and additional information from many sources over time, including from the pal. The intelligent agent can learn, adapt, change, and improve.

The intelligent agents, the devices, the companions, the hardware elements, the interfaces, and the modes, and other aspects, individually and in combinations are part of a digital companion system (which we sometimes refer to simply as the "system"). The system can include a wide range of other elements such as computer servers that host the automated intelligent agents and other processes, call centers that host the human intelligent agents, communication channels, wired and wireless networks, network interfaces, databases, software, operating systems, mobile apps, and storage, among other things.

The system can be brought to bear on a very wide range of applications in many different fields, including therapy, personal improvement, personal assistance, training, advice, companionship, and others.

In one set of applications that we discuss below, the system hosts a set of companions that provide affinity therapy for a corresponding set of autistic children who have access to mobile telephones. We sometimes call this the "affinity therapy application." Among other things the affinity therapy application can be used to improve the social skills of the children or adults being treated. Information about affinity therapy can be found, for example, at http://well.blogs.nytimes.com/2014/04/07/inside-the-mind-of-a-child-with-autism/?_r=0; http://yaledailynews.com/blog/2014/04/15/suskind-sparks-autism-research/; and https://iacc.hhs.gov/non-iacc-events/2014/nimh_lecture_ron_suskind_042414.pdf.

A requirement of the system in providing affinity therapy is that the portrayal of the companions be predictable, especially with respect to the form of and repetitions of the interactions and conversations. By associating the interactions and conversations with sound or music delivered from the device, the interactions and conversations can be bound to the emotions of the pals. The system and the intelligent agents use computer processes to implement such consistency, predictability, and repetition and associations with music or sound. A key advantage of and a distinction between the device and a human therapist offering similar prompts and references, is that the devices is endlessly patient and consistent. The latter is a key feature for those with autistic spectrum disorders who are comforted by consistency and, thereby, freed and strengthened to manage unanticipated sensory inputs. A small, stigma-free device (a socially acceptable mobile phone) they can carry will act as a comfort, much like a morphine pump of comforting, inspiring or motivating references or instructions that they can tap as needed to manage cognitive tasks, emotional needs, interactions, and unpredictability. Usage of the device will help it become increasingly accurate in predicting what the user needs in an increasingly variety of situations and interactions.

Although we use affinity therapy as an example, there are a wide variety of other applications for the system. Many of the features and benefits of the affinity therapy application apply similarly to other applications of the system.

The affinity therapy application of the system performs a range of functions and activities to provide affinity therapy, including the ones described below, The affinity therapy application accumulates, stores, analyses, and uses a variety of information over time (which we sometimes call "input data") for a range of purposes. Among the uses of the input data are to develop a specific understanding of each of the pals being served, to modify and update that understanding over time, to cause the companion for each of the pals to be configured, developed, and evolve over time to best serve their respective pals, to maintain and update expert information about autism and affinity therapy and apply the information to the work of the intelligent agents, and others.

For each pal, the affinity therapy application gathers personal information, including the pal's name, age, sex, and relatives of the pal. The personal information can be gathered by interaction with the pal through the pal's device, or can be provided by a physician or a relative of the pal through the pal's device or another device during a registration process. The personal information can be assembled and stored at a server. Among other uses, the personal information can enable the intelligent agent and the system to select and present effectively the content (substance and form) of the companion's dialogue in segments of the conversations with a pal.

For example, the age of the pal can significantly affect the selection of vocabulary, grammar, tone, depth, and other formal aspects of the companion's side of such a conversation. The personal information can also help the intelligent agents and the system to determine the most effective substance and form for the companion's side of a conversation. For example, the personal information aids affinity discovery in which the intelligent agent could apply the principle that users of the same age or sex usually have similar affinities.

Also important in affinity therapy is to understand the beliefs, opinions, and emotional reactions to various concepts. The input data can include information about such beliefs, opinions, and emotional reactions that is derived, in many cases, from the pal. In some instances, this input information can be acquired by the intelligent agent causing the companion to converse with the pal on a range of topics, such as sports or history or maps or movie genres. The content and form of the dialogue segments received from the pal in response are stored and can be analyzed to derive beliefs, opinions, and emotional reactions.

The intelligent agent has as one of its functions to discover goals of the pal who is associated with each of the companions. Discovery of goals can be facilitated by input information, including the user's personal information, and the details of conversations and interactions between the pal and the companion.

Interaction details are detected and stored for every conversation and interaction of the pal with the companion. Interaction details can include natural language dialogue segments (we also sometimes refer to dialogue segments as segments of conversations), but also can include activities and actions (inputs) of the pal that are reflected in his use of the device and the interface, including how often there is a conversation, the duration of a conversation, the volume level of the pal's voice, the pace of the conversation, manipulation and use (e.g., input) by the pal of interface elements and hardware elements, how each of those factors changes over time, and a wide variety of other factors. In addition to the input information, the intelligent agent can use the inferred beliefs, opinions, and emotional reactions of the pal in discovering goals of the pal. As simple examples, if the pal says "I'm lonely" the intelligent agent can determine that a goal is to find friends; if the pal says "I'm bad at math," the corresponding goal could be to learn math.

The intelligent agent can build, store, and use a personal knowledge graph for each user. The knowledge graph identifies elements of information related to a pal and associations among those elements. The elements may include, for example, personal information, beliefs, goals, opinions, and emotional reactions. The knowledge graph is useful in the work that the intelligent agent performs to provide affinity therapy for each pal.

The stored interaction details for conversations and interactions of pals with companions can be used for offline processing to improve the quality of features of the system, such as speech, conversations, and natural language understanding, and to develop additional knowledge about the pal's information, beliefs, opinions, goals, and desires, for example. The recorded logs of interaction details and related stored information (such as anonymized personal information of the pals) can also be made available for academic research, for example, by neuroscientists studying autism or other neurological conditions, like attention deficit hyperactivity disorder (ADHD), obsessive compulsive disorder (OCD), Alzheimer's Dementia, or post traumatic stress disorder (PTSD).

Also included in the input data gathered and used by the intelligent agent and the system are background information and knowledge available from a wide variety of Internet sources, including Wikipedia and news feeds. This input data can be used to update stored information in the system about concepts that are interesting to the pals and therefore useful in the affinity therapy. This input data gathering, which we also sometimes call knowledge mining, can be performed either by an automated software agent (web crawlers) running on servers of the system, or by human experts who enter gathered information into the storage of the servers.

In some implementations, the behavior and character of the companion as portrayed to the pal by the system are as natural as possible. We sometimes refer to a companion that has a highly natural character and behavior as a "good actor". Among the aspects of the behavior and character of a good actor are that it both responds and initiates conversations, can adopt a variety of different moods in the conversations, can show a variety of different emotions, and will sometimes interrupt the user (instead of waiting for the user always to finish its sentence). The intelligent agents and the servers of the system have processes that effectuate the naturalness of the conversations through the devices and interfaces with the pals.

Based on intelligent agent processes, the behavior and character of the companions portrayed by the system to the pals can provide the impression to the pals that the companions have their own opinions, beliefs, and emotional reactions, which are tailored for each pal based on the character and behavior of the pal, the context in which the companion is being portrayed, and other factors. These aspects of the companions can also change over time. The intelligent agents can define and embody these opinions, beliefs, and emotions about a variety of subjects based on the stored input data, including knowledge mined from the Internet, and based on the goal of the affinity therapy, to engage and help the pal. The fact that a companion has opinions, beliefs, and emotional reactions, and the content of them, enhances the impression of the companion as a good actor.

To be an effective companion to a pal, the intelligent agent must be able to cause the companion to correct itself in real time during or shortly after a conversation with the pal. The ability to correct itself also contributes to the companion being a credible good actor. In some examples, the companion can be corrected interactively in response to what a pal says during or after a conversation, through spoken or text input during or after a non-speech interaction, or by detecting and analyzing inputs from other hardware elements, indicating a pal's sentiment, emotion, engagement, or other aspects of the pal's character or behavior, and signaling that a correction is needed.

In addition, the intelligent agent can implement aspects of self-awareness of a companion based on the knowledge graph that the intelligent agent maintains about the companion and its opinions, beliefs, and reactions. The states of the device, the interface (for example, which interface elements are present on a display that is portraying the companion and what are their states), processes running on the device, and the current character and behavior of the companion as portrayed to the user are known to the intelligent agent. Self-awareness of the companion contributes to its role as a good actor.

The pals who receive affinity therapy from companions using the system will predictably fall into groups based on their behavior, character, opinions, beliefs, emotional reactions, desires, goals, and in other ways. Pals who fall into a given group can be treated similarly to one another by the system to achieve the desired results. For example, one or more of the dialogue segments, the character and behavior of the companions, and a wide range of other aspects of conversations and interactions may be similar for all of the pals in a given group. The intelligent agent can use machine-learning and other computer-based techniques with respect to the input data and stored information to automatically categorize and group the pals that it is serving. The intelligent agents then can operate according to the categories and groups.

In order to improve the efficiency and quality of the processing done by the intelligent agents, the system provides for a uniform format for representation of concepts. The concepts provide the foundation for the interaction and the conversations associated with the affinity therapy that occur between the pals and their companions. For that reason, the efficiency and quality of the affinity therapy can benefit by a consistent format for expressing the concepts. The consistent format can be used, for example, in the dialogues and segments that form conversations, in the knowledge graphs stored by the system, in information presented visually on a display, and in other ways.

For instance, using a common affinity for Disney animated movies, some autism spectrum disorder (ASD) children embrace the line from Pinocchio that "I'm a real boy" as a statement of identity and of how they are wrongly seen by others as diminished. Such evocative lines would grow in a natural crowd-sourced embrace across the network of users arrayed around that affinity, deepening the knowledge graphs of all users. The hit song "In Summer" from Frozen (2013)—where the snowman sidekick, Olaf, dreams of experiencing warm weather—could be turned into a lexicon between an intelligent agent and a pal, that someone is "olafing" when they dream of things that may not be in their best interests. A process of continuous improvements in the knowledge graph would grow usage and be responsive to needs and desires of pals and ongoing changes in the cultural landscape.

With respect to the operation of the intelligent agents, the system can operate in various modes.

In one mode, which we refer to as the Wizard of Oz, or WOz, mode, the system is operated in response to one or more human intelligent agents. In this mode, conversations and interactions between pals and companions are driven and governed by choices made and information provided by the human intelligent agents based on stored and real time information that is available to them from the system (and elsewhere in some cases).

The information available to them may include real-time sound and video derived from the pals during the course of interactions or conversations, stored information about the pals, the contexts in which the interactions or conversations are occurring, and information generated by the automated intelligent agents or provided to the human intelligent agents.

Based on the available information, the human intelligent agents can, through a WOz user interface (running on a workstation or a mobile phone or other portable device, for example) select or specify features of the character and behavior of the companion and the form and content of conversations and interaction, among other things. The human intelligent agents can be related to the pals (parents or other family members, for example) or may be unrelated third parties (say, located in a call center) who have skill and experience in providing affinity therapy or in using the system or both. The selections and specifications provided by the human intelligent agents are transformed into corresponding portrayal of the companions to the pals.

In a different, purely automated mode of operating the system, all of the intelligent agents are implemented by processes running on computers. These automated intelligent agents use real-time and stored information of the kinds already mentioned, and possibly other kinds, and a variety of intelligent agent analyses, processes, and techniques to control the character, behavior, and portrayal of each of the companions, and the content and form of the conversations and interactions, among other things. All of these steps are taken automatically without human intervention. The system can continuously and effectively provide affinity therapy for large numbers of pals at low cost.

A third mode of operation involves a combination of WOz mode and automated mode (which we sometimes call mix mode), a combination of the work of human intelligent agents and automated intelligent agents drive the system. The nature of the mix of the two kinds of agents can vary over a wide range. In some implementations, the system can be operated primarily automatically by automated intelligent agents without human involvement. But the automated intelligent agents may pose questions to human intelligent agents when the automated intelligent agents are unable to react intelligently during conversations or interaction with a pal. For example, if a pal asks a question that the intelligent agents do not understand based on previous experience or available stored information, the automated intelligent agent may ask a human intelligent agent for help.

One way to get help from a human intelligent agent is to show a conversation to him (in some cases in a text message). If there is a delay while an answer is being provided by the human intelligent agent, the automated intelligent agent can stall the conversation for a few seconds (e.g., by having the companion scratch his head, as if he is he's thinking). For example, if a pal asks a question during a conversation such as "Can I watch the rerun episode of the Simpsons on television tonight?" the automated intelligent agent could send the conversation to a call center to determine whether a Simpsons episode is being broadcast and at what time. If so, the agent could then send a question to the pal's father asking if it is okay for the pal to watch the episode at that time.

Because an important feature of the affinity therapy application (and many others) is spoken conversation between a pal and a companion, the system provides a variety of features for speech processing and voice processing.

In some cases, when operating in WOz mode, information from the human intelligent agent is provided in the form of speech essentially as a spoken utterance by the human intelligent agent in response to a dialogue segment received from the pal. For example, the pal may ask a question, and the human intelligent agent speaks a reply. Because the companion is often portrayed as a character other than a human being known to the pal, the system provides voice processing functions that can automatically convert the voice signal of the speaker into a voice that has been associated with the companion. The speech is not affected, only the characteristics of the voice that presents the speech.

This morphing of the voice signal into a voice expected by the pal imparts a continuity to the behavior of the companion that can make the pal comfortable with the conversation and interaction. Among other things, this voice morphing permits human intelligent agents whose voices are known to the pal (for example, family members) to speak without being recognized. In some cases, the morphing allows a variety of different human intelligent agents with different voices to speak dialogue segments that will all be morphed to a single voice that is associated with the companion. Thus, the morphing allows a many to many mapping of human voices to companion voices.

In a similar vein, the system can provide a transformation of the lexical, grammatical, vocabulary, tone, and style characteristics of the speech of a human intelligent agent or of an automated intelligent agent into such characteristics of the companion as portrayed to the pal. This character morphing assures consistency and acceptability to the pal of the conversations and interactions of the companion. Among other things, different intelligent agents can provide different kinds of speech containing given content and their speech can all be converted to a common speech style associated with the companion. (See, for example, http://www.acapela-group.com/.) The ability to convert voice and speech from a form that is typical of a source into voice and speech that is typical of a different party, without changing the content, also enables the system to convert a particular dialog segment from a source into two or more differently spoken dialog segments of two or more different companions.

In other words, the system can morph speech of one or more sources into speech of one or more companions without changing the content. This reduces the cost and improves the quality of interactions and conversations produced by the system for pals.

In addition, the system includes speech synthesis and speech recognition processes. For example, the system can convert text from an intelligent agent or other source into synthesized speech that mimics the speech that the system has associated with one or more different companions. Conversely, the system can be trained in a speaker dependent mode to effectively and accurately recognize speech of a broad group of pals. This feature is especially effective for pals who are children or who otherwise have special needs.

To enable the system to perform such voice morphing, speech morphing, speech synthesis and speech recognition, the system stores and maintains information that defines characteristics of the voice and speech of human speakers, including the pals and the intelligent agents, and of the companions.

Another important aspect of the operation of the system is its ability to correct the behavior, conversation, understandings, perceptiveness, and other characteristics of the companions so that they are not perceived as rudimentary, rude, uninteresting, or incompetent, but rather as competent, polite, helpful, interesting, engaging, and have other useful qualities, for example.

Intelligent agents appear premature in their development when they misunderstand someone. Misunderstanding can happen for various reasons, including when a dialog segment or other interactive input is not within the scope of the understanding of the intelligent agent, for example, because the vocabulary or grammar is not one for which the intelligent agent has been trained. Another example is when the intelligent agent has incorrectly heard what a pal has said (for example because of poor speech recognition results). A pal who is interacting with the system cannot easily know the limits of the scope of training of the intelligent agent or the causes of speech recognition errors, which can make the intelligent agent unpredictable causing frustration for the pal.

To reduce the misunderstandings and frustration, the intelligent agent can be taught to recognize (or be told by the pal) when it encounters an out-of-scope or misunderstood situation. Then the intelligent agent can interact with the pal (or with a third party such as a human intelligent agent) to expand the scope of its knowledge, or to learn new vocabulary, grammar, knowledge, and pronunciations, for example. In some cases, the intelligent agent could begin with no pre-established scope, vocabulary, or knowledge, and learn everything from scratch. As a result, some misunderstandings could be avoided.

The system can be implemented using a wide variety of technologies including hardware, software, firmware, clients, servers, networks, databases, and combinations of them.

In some implementations, the system includes an app running on a mobile device such as a cell phone. On its user-facing side, the app generates and manages conversations between the companion and the user. On its system facing side, the app communicates through a network connection with a system server to pass information back and forth that is derived from the pal speaking or taking actions through the interface or is to be used by the app to present the conversations and interaction to the pal. The app may have access to information stored on the mobile device that relates to the companion, to the pal, and to the interactions and conversations.

The app and the system server can communicate through a communication channel that is part of, for example, a wireless or wired network.

On its device facing side, the system server provides information and instructions that will enable the app running on the mobile device to generate and manage the conversations between the companion and the user. The system server also has a side facing the human and automated intelligent agents. The system server communicates with the human and automated intelligent agents through a communication channel that is part of, for example, a wireless or wired network, or in the case of automated intelligent agents by direct communication processes within the server. The system server includes hardware and software that receives, for example, natural language communications from the intelligent agents that is to be used by the device to portray the companion to the user in conversations and interactions. The server processes the natural language communications and forwards them on to the device. The server also receives natural language communications of the pal from the device and forwards them to the intelligent agents for processing.

The app running on the device in the system operates as a client to the system server. Among other functions, the app can include a character animation engine that is part of an avatar and scene controller (which acts in part as an interaction engine). The engine and the controller of the app use the natural language information provided by the server in portraying the companion to the pal. A database of character information for the companion can be stored in the device for use by the app in portraying the companion. When the pal speaks to and otherwise interacts with the device, the app running on the device feeds the speech and other interaction information back to the server for forwarding to the intelligent agents.

The system server runs software to perform a variety of functions. A dialogue controller (which we also sometimes call a modality controller) receives the speech of the user and other interaction information from the device and forwards to a human intelligent agent (e.g., a family member or a call center) or automated intelligent agent. The dialogue controller also receives outgoing synthesized speech and other interaction information from the intelligent agents and forwards it to the device where the app can use it for conversations and interactions of the portrayed companion, with the pal.

The server includes databases that store usage logs and knowledge that can be used in the work of the server. The fact that a pal is using the device and conversing with the companion is logged into the usage logs by a logger that watches the conversations and interactions as they are occurring.

Also running on the server is an analytical engine that can review the logs and the knowledge base to analyze a wide variety of aspects of the pal's use of the device. The performance of the pal over time, the improvement in the pal's condition over time, and other useful analytical results can be generated. In some cases, the analytical engine provides a user interface through which an analyst can review logged information, perform and input analytical information, and review analyses performed by the software.

When the system server is using a human intelligent agent to provide it with speech and interaction information for use in the course of a conversation or interaction with the pal, the server communicates (for example, through a network) with a WOz client.

In some cases, the WOz client is a mobile app running on a device used by the human intelligent agent (e.g. a parent, or a trained professional in a call center). The device serves as a two way conduit for speech and interaction information related to a conversation or interaction between a pal and a companion on the pal's device. The WOz client can provide a variety of functions. One operation is to present the pal's interaction and conversation (speech) to the human intelligent agent, receive responsive speech and interaction of the human intelligent agent, and forward the responses through the server to the app running on the device to enable the conversation and interaction to proceed along a useful course.

Additional information is available to the WOz client app that can provide clues to help the human intelligent agent in crafting responsive speech and interaction. These clues can include the pal's name, location, stored video of the pal, a history of previous dialogues, hints on good responses, the behavior and character of the companion interacting with the pal, and a searchable list of suggested responses, among others. The clues can be stored on the device being used by the human intelligent agent (from information received earlier from the server) or can be provided in real time from the server, or a combination of the two. In some cases, proposed responses and hints on good responses could be provided by an automated intelligent agent. The automated intelligent agent may be receiving the same speech and interaction that the human interactive agent is receiving, and may determine good responses or hints based on the speech and interaction or based on historical conversations and interactions, among other things.

In some implementations, the automated intelligent agent is an application running on the server (although it could also run on another computer or in another location) that receives the speech and interaction of the pal from the server, processes it to determine a good response, and produces speech and interaction information to send back through the server to the app running on the device for use in presenting another segment of dialogue or other interaction with the pal.

The automated intelligent agent can operate through modules of the software that perform speech recognition on incoming speech and speech synthesis to form outgoing speech. In addition, the automated intelligent agent can include a language understanding module that takes the recognized incoming speech and infers from it meaning related to the conversation and interaction between the pal and the companion. In other words, it interprets what has been said or meant by the conversation and interaction.

Based on the understood meaning, the agent operates using intelligent processes to decide on a good response (conversation and interaction) to be given to the pal. A language generation module then produces information that describes natural language replies (such as sentences) and delivers them to the speech synthesizer module.

In some examples, the core functionality of the system is therefore to provide a digital companion for the pal in such a way that the pal finds the companion credible, appealing, acceptable, and well behaved. As a result, the system can generate interaction and conversation with the pal that can successfully deliver affinity therapy to the pal.

A variety of available and proposed components or parts of them could be used to implement portions of the system.

In addition to the hardware elements mentioned earlier, the system can include neuro-morphic chips or other devices that can quickly process data representing the pal's needs, affinities, requests and desires, and also create a "contextualizing bubble" of all that's happening around a pal or user. This capability is useful because the pal or user may be unaware of or partially unaware of his context, that is "context-blind" (a term used with respect to autism) or context-challenged, in not being able to swiftly identify and process external inputs. Additional information related to this concept can be found at http://www.wired.co.uk/news/archive/2014-08/08/ibm-brain-like-chip.

In some applications, the user device can be integrated into or used with tele-medical devices and functions, wherein sensors, linked through the device to the Internet, can monitor biological functions (heart rate, fatigue, oncoming anxiety). The device can remind a user to take medications at certain intervals, describe anticipated effects and monitor the physiological response.

Various elements of the technology used to implement the system may be derived from available products and services. Most notably, a GPS to show whereabouts of the user at any given moment to a support group (family members, therapists, friends, physicians and emergency medical units).

Natural language processing capabilities are available through many existing agents, including Viv Labs (located in San Jose, Calif.). The NPCEditor (http://people.ict.usc.edu/~leuski/publications/papers/npceditor.pdf) is a tool to construct a question-answering virtual human characterized by a collection of responses relevant to a particular topic. The tool uses information retrieval techniques to match text and attempts to draw the user back to the domain of the conversation when the user wanders from it. Cleverscript (www.cleverscript.com) and an example implementing an avatar (http://www.existor.com) provide a rule based natural language processor. [A simple manual is found at http://www.cleverscript.com/CSL/CleverScriptManual.pdf.]

Dialogue or conversation management facilities are described in "Sorry, I Didn't Catch That!—An Investigation of Non-understanding Errors and Recovery Strategies" [http://www.cs.cmu.edu/~dbohus/docs/nonu_final.pdf].

Among the available functions are AskRepeat, AskRephrase, Reprompt, DetailedReprompt, Notify, Yield, MoveOn, YouCanSay, and Help. In the paper Predicting Tasks in Goal Oriented Spoken Dialog Systems using Semantic Knowledge Bases [https://aclweb.org/anthology/W/W13/W13-4038.pdf] task prediction is defined as a classification problem (using semantic context) rather than a (semantic) parsing problem.

With respect to learning from scratch, see Jeff Hawkins (HTM-Numeta Inc); Percy Liang (Semantic Parsing-Stanford); Ronan Collobert (DNN-Princeton); Richard Socher-semantic vector for phrases (MetaMind, Stanford); and O*learning: http://agi-conf.org/2014/wp-content/uploads/2014/08/strannegard-general-agi14.pdf.

Knowledge sources that might be used by intelligent agents include movie scripts; Viv labs knowledge base; NELL (Never Ending Language Learning by Tom Mitchell from CM); Freebase; DBPedia (Wikipedia); Schema.org Sources of information related to Chatbots include Cleverbot (by Rollow Carpenter) which learns from the Internet to talk like a human; JabberWacky (by Rollow Carpenter) which uses videogrammetery to provide facial movements as an avatar talks; and Eugene Goostman.

Voice morphing examples include the open source voice converter from CMU (http://www.festvox.org/transform/); and the Screaming Bee [http://www.screamingbee.com/]; and "The Text-To-VoIP Plug-In for MorphVOX Pro allows you to speak over the Internet or soft-phone using customizable text-to-speech voices."

Automatic speech recognition and text to speech systems include those available from Nuance; http://www.ispeech.org; http://www.acapela-group.com/voices/custom-voice-creation; https://www.cereproc.com/en/support/faqs/voicecreation; and http://www.ai-j.jp/english/product/customvoice.html Available animation systems include ToyTalk (SF); Reallusion (Crazy Talk Unity plug-in) (SJ); Speech Graphics (Scotland, branch in SJ); SitePal (http://www/sitepal.com/ttswidgetdemo/) (NY); (http://www.existor.com); Disney; and Tomaso Poggio (MIT): Trainable Videorealistic Speech Animation (http://cbcl.mit.edu/cbcl/publications/ps/siggraph02.pdf)

The modules for servers for the system could be built on a variety of systems depending on the features: for example, Analytics (Spark), logging (Flume, Messageq); data mining/ML (Spark); hosting and data center considerations (Amazon ec2).

Tools for annotating and evaluating dialogues, sentiments, and creating test corpora include: for annotation standards: MRDA (meeting recording dialogue act), DAMSL; annotation tools: brat, Viv; and evaluation framework: Viv The modules of the system may be deployed in part or in whole through a combination of hardware and software components which interoperate through a variety of networks. Each module may be implemented as software running on client devices, user desktop computers, or network or cloud-based servers or on a combination of these computing platforms. Some of the modules operate in real time while the user is interacting with the system and some modules operate as offline processes for model building, tools for annotation, analytics creation, voice and personality development, system operation and maintenance, and other offline functions. A set of network interfaces and protocols allow communication among the modules. Modules and protocols may either be custom developed as part of the system or may be existing modules and protocols.

All of the materials cited in our discussion above are incorporated here by reference.

The systems and techniques described here can be implemented in digital electronic circuitry, or in computer hardware, firmware, software, or in combinations of them. The techniques can be implemented as a computer program product, a computer program tangibly embodied in an information carrier, in a machine-readable storage device or in a propagated signal, for execution by, or to control the operation of, data processing apparatus, such as a programmable processor, a computer, or multiple computers.

Such a computer program can be written in any form of programming language, including compiled or interpreted languages and object-oriented languages. The program can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Activities involved in the techniques described here can be performed by operating on input data and generating output. The activities can also be performed by and implemented as special purpose logic circuitry, for example, an FPGA (field programmable gate array) or an ASIC (application-specific integrated circuit). Modules can refer to portions of the computer program or the processor or special circuitry that implements that functionality.

Processors suitable for the execution of a computer program include, for example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, such as internal hard disks or removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a distributed computing system that includes a back-end component, for example, as a data server, or a middleware component, for example, an application server, or a front-end component, for instance, a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include cellular telephone system, and a local area network ("LAN") and a wide area network ("WAN"), such as the Internet, and can include both wired and wireless networks.

Other implementations are also within the scope of the following claims.

The invention claimed is:

1. A computer-implemented method comprising
providing affinity therapy through a mobile telephone to improve a diagnosed psychological state of an autistic child,
the providing of the affinity therapy comprising
through the mobile telephone developing a relationship between the autistic child and a consistently presented animated character portrayed on the mobile telephone, the developing of the relationship comprising
facilitating successive spoken conversations and non-spoken interactions through the mobile telephone between the autistic child and the animated character portrayed on the phone, at least some of the successive spoken conversations and the non-spoken interactions being interleaved, the relationship being developed over a time period that spans the successive spoken conversations and non-spoken interactions,
the facilitating of a current one of the successive spoken conversations comprising:
presenting to the autistic child a segment of speech of the animated character, the speech of the segment conforming to speech qualities that are characteristic of the animated character and are presented consistently with the speech qualities of other speech segments of the current spoken conversation and of others of the successive spoken conversations, the segments of speech comprising segments of morphed versions of human speech of two different humans,
detecting a segment of speech of the autistic child, the autistic child's segment of speech and the segment of speech presented to the autistic child comprising a portion of the current spoken conversation, and presenting to the autistic child a subsequent segment of speech of the animated character, the subsequent segment of speech being determined by a choice made by an intelligent agent comprising a human, the choice having been made by the human in response to an automated presentation through a user interface of a list of suggested responses, the list of suggested responses being produced by intelligent processes applied to the detected segment of speech of the autistic child.

2. The method of claim 1 in which the animated character is portrayed through speech and images or video.

3. The method of claim 1 in which the relationship is caused to change over time.

4. The method of claim 1 in which characteristics or behavior or both of the animated character changes over time based on intelligent processes of the intelligent agent.

5. The method of claim 1 in which the time period over which the relationship is developed is at least a year.

6. The method of claim 1 in which the non-spoken interactions comprise presenting information to the autistic child.

7. The method of claim 6 in which the information is presented on a display of the mobile telephone.

8. The method of claim 1 in which the non-spoken interactions comprise receiving input from the autistic child.

9. The method of claim 1 in which the segment of speech of the autistic child and information about non-spoken interactions are provided in real-time to a human.

10. The method of claim 1 in which the intelligent agent comprises an automated process.

11. The method of claim 1 in which the intelligent agent comprises both an automated process and the human.

12. The method of claim 1 in which the autistic child is unaware of the operation of the intelligent agent.

13. The method of claim 1 comprising the intelligent agent explicitly or implicitly eliciting from the autistic child information about the autistic child's beliefs, opinions, emotions, goals, or desires.

14. The method of claim 1 comprising the intelligent agent deriving personal and demographic information about the autistic child.

15. The method of claim 1 comprising the intelligent agent acquiring knowledge from public online sources of general information.

16. The method of claim 1 comprising forming a knowledge graph for the autistic child.

17. The method of claim 1 comprising maintaining a log of the successive conversations and interactions between the autistic child and the device.

18. The method of claim 17 comprising making the log available to a third party for study.

19. The method of claim 1 in which the animated character is portrayed as having certain characteristics that include at least one of the following: responsiveness, initiative, moodiness, emotion, opinions, beliefs, correct ability, and self-awareness.

20. The method of claim 1 in which facilitating successive spoken conversations and non-spoken interactions comprises correcting the intelligent agent when it makes a mistake.

21. The method of claim 1 comprising stereotyping the autistic child and other users who share common characteristics, and operating the intelligent agent to take advantage of the stereotyping.

22. The method of claim 1 comprising representing concepts used in the successive spoken conversations and non-spoken interactions by a uniform knowledge representation.

23. The method of claim 1 in which the morphing comprises morphing to the vocabulary, grammar, and knowledge of the animated character.

24. The method of claim 1 in which the intelligent agent comprises an automated intelligent agent, and the automated intelligent agent learns from scratch rather than being pre-trained.

* * * * *

UNITED STATES PATENT AND TRADEMARK OFFICE
CERTIFICATE OF CORRECTION

PATENT NO. : 9,704,103 B2
APPLICATION NO. : 14/571472
DATED : July 11, 2017
INVENTOR(S) : Ronald Steven Suskind, H. Owen Suskind and Cornelia Kennedy Suskind It is certified that error appears in the above-identified patent and that said Letters Patent is hereby corrected as shown below:

In the Claims

Column 17, Line 34 (approx.): In Claim 9, delete "a human." and insert -- the human. --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*